(12) United States Patent
Ghaemi et al.

(10) Patent No.: US 10,841,827 B2
(45) Date of Patent: *Nov. 17, 2020

(54) RADIO FREQUENCY (RF) POWER MEASUREMENTS IN COMMON PUBLIC RADIO INTERFACE (CPRI) SPECTRUM ANALYSIS

(71) Applicant: VIAVI SOLUTIONS INC., San Jose, CA (US)

(72) Inventors: Nick Ghaemi, Germantown, MD (US); Roy Anderson, Spokane, WA (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,468

(22) Filed: Oct. 4, 2019

(65) Prior Publication Data

US 2020/0037194 A1    Jan. 30, 2020

Related U.S. Application Data

(63) Continuation of application No. 16/013,667, filed on Jun. 20, 2018, now Pat. No. 10,470,070.

(51) Int. Cl.
*H04W 24/10* (2009.01)
*H04B 17/00* (2015.01)

(52) U.S. Cl.
CPC ............ *H04W 24/10* (2013.01); *H04B 17/00* (2013.01)

(58) Field of Classification Search
CPC ............................. H04W 24/10; H04B 17/00
See application file for complete search history.

(56) References Cited

U.S. PATENT DOCUMENTS

| | | |
|---|---|---|
| 2011/0207418 A1 | 8/2011 | Laroia |
| 2014/0241407 A1 | 8/2014 | Azary |
| 2017/0244507 A1 | 8/2017 | Hannan |
| 2019/0150098 A1 | 5/2019 | Matsumura |

*Primary Examiner* — Afshawn M Towfighi
(74) *Attorney, Agent, or Firm* — Mannava & Kang, P.C.

(57) ABSTRACT

A test device for testing a power of a signal at a cell site using RFoCPRI™ is disclosed. The test device may comprise a receiver to receive a signal from a test point near a baseband unit (BBU) of a cell site. The test device may also comprise a processor to determine power of the signal. The processor may identify IQ data from the signal, determine an offset based on a noise floor determined from at least one specification of a remote radio head (RRH) of the cell site, and generate a power spectrum based on the IQ data and the offset. The processor may transmit the power spectrum to an output (e.g., display), to where the power spectrum may be representative of the power of the signal between the RRH and antennas of the cell site.

20 Claims, 8 Drawing Sheets

RADIO FREQUENCY (RF) POWER MEASUREMENTS IN COMMON PUBLIC RADIO INTERFACE (CPRI) SPECTRUM ANALYSIS

PRIORITY

This application is a Continuation of commonly assigned and co-pending U.S. patent application Ser. No. 16/013,667, filed Jun. 20, 2018, the disclosure of which is hereby incorporated by reference in its entirety.

TECHNICAL FIELD

This patent application relates generally to telecommunications networks, and more specifically, to systems and methods for testing telecommunications networks by measuring radio frequency (RF) power in common public radio interface (CPRI) spectrum analysis of a cell site.

BACKGROUND

A modern telecommunications cell site relies on a distributed architecture, where a base-station transceiver subsystem (BTS), for example, is divided into two main elements. The first is a baseband unit (BBU) that typically resides at the base or bottom of a cell tower. The second is a remote radio head (RRH) that performs radio frequency (RF) functions near antennas near the top of a cell tower. Because of this distributed architecture, RF access is generally only available at the top of the cell tower. Given the height of such a tower, detecting and measuring interference can be quite cumbersome, costly, and even dangerous.

Recent technological developments have been made to provide communications between the BBU and the RRH. For instance, the BBU and the RRH may communicate via a common public radio interface (CPRI). In particular, RF over CPRI (RFoCPRI™) technology has enabled effective RF analysis from the base of the tower, minimizing dangerous tower climbs and associated costs and inefficiencies. A technical problem, however, is that a test instrument that analyzes a CPRI signal, for example, may not typically report RF power, or if it does, it may not be accurately measured or reported. RF power measurements are often measured using other test devices, and these test devices may not be entirely reliable as well. As a result, a technique that measures RF power using CPRI spectrum analysis may be helpful to increase network testing efficiencies and overcome shortcomings of conventional technologies.

BRIEF DESCRIPTION OF DRAWINGS

Features of the present disclosure are illustrated by way of example and not limited in the following Figure(s), in which like numerals indicate like elements, in which.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, a distributed cell site may have a baseband unit (BBU) that resides at the base or bottom of a cell tower and a remote radio head (RRH) that performs radio frequency (RF) functions located near antennas at the top of the cell tower. Modern cell architecture has also replaced coax-based feeders with fiber-based ones to connect the BBU and RRH. This change has reduced problems associated with signal loss and reflections. However, since RF interfaces reside on the RRH, most RF maintenance, troubleshooting, or measurements still requires access at the top of a cell tower. Tower climbs and access to the RRH may burdensome, inefficient, and even hazardous.

Recent advancements in technology have made it possible for the BBU and the RRH to communicate via a common public radio interface (CPRI). In particular, RF over CPRI (RFoCPRI™) technology has enabled effective RF analysis from the base of the tower, minimizing dangerous tower climbs and associated costs and inefficiencies. However, a test instrument that analyzes a CPRI signal, for example, may not generally report RF power, or if it does, such reports may not be accurate or reliable. Furthermore, RF power measurements are often measured by using other test devices. Not only is this cumbersome for any network operator or technician, but these separate test devices may not be entirely reliable as well. Accordingly, techniques for measuring RF power using a test device that performs CPRI spectrum analysis are disclosed herein.

Figure 1:
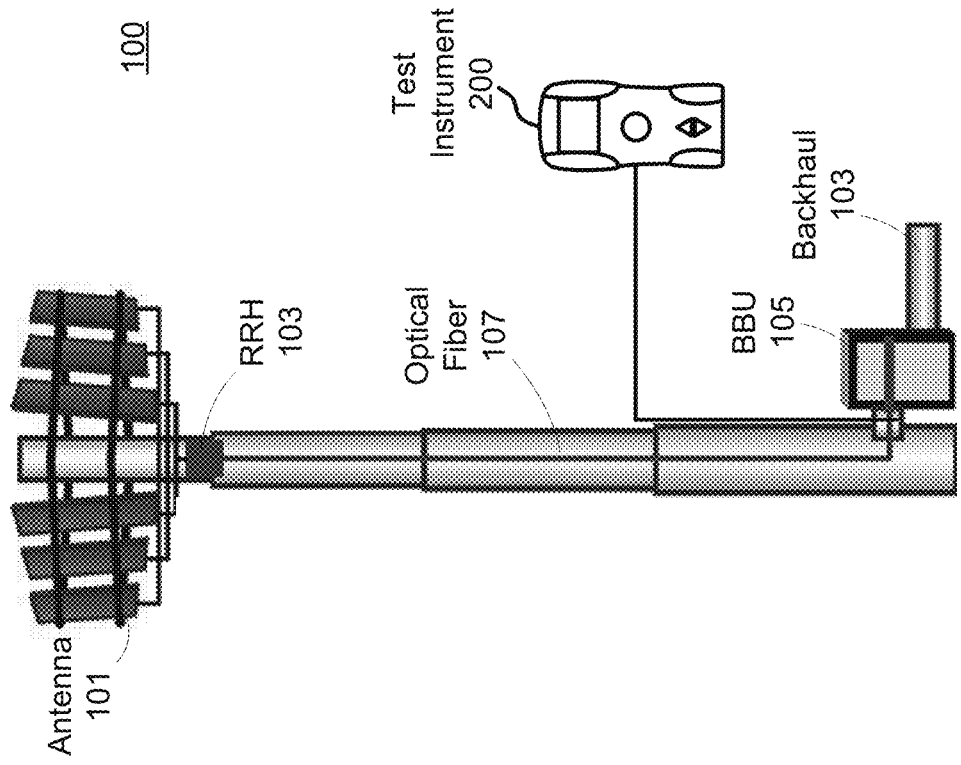
FIG. 1 illustrates a distributed cell site with a test instrument that performs common public radio interface (CPRI) spectrum analysis, according to an example.

FIG. 1 illustrates a distributed cell site 100 with a test instrument that performs CPRI spectrum analysis, according to an example. As shown, a cell site 100 may be a tower with one or more antennas 101 near the top of a cell tower. The cell site 100 may be a distributed cell site having at least one remote radio head (RRH) 103 that performs radio frequency (RF) functions. The RRH 103 may be located near antennas 101 at the top of the cell tower. The cell site 100 may also have at least one baseband unit (BBU) 105 that resides at the base or bottom of the cell tower. An optical fiber 107 (or fiber-based or optical feeder) may connect the BBU 105 and the RRH 103. The BBU 105 may be connected to a backhaul 109, which may include base station controllers or other components that provide network connectivity standard to telecommunications industries. A test instrument 200 may measure signals at the cell site 100 at various test points.

The RRH 103 may include various components and circuitry. For example, the RRH 103 may include radio equipment (RE) having various RF circuitry, such as converters, filters, oscillators, amplifiers, modulators, etc. These components may allow the RRH to covert optical signals to electrical signals, and vice versa. This may be particularly useful in CPRI. Other features of the RRH 103 may include receiving/transmitting a desired band of signals from/to antennas, amplifying signals to desired power levels, filtering signals, converting signals, or other related actions.

The BBU 105 may a unit that processes baseband at call sites for telecommunications systems. Baseband may refer a signal that has a very narrow and near-zero frequency range, e.g., low-pass or non-modulated signal. The BBU 105 may include, among other things, radio equipment control (REC) which is responsible for communication through the physical interface. The BBU 105 may be connected to a backhaul 109, which in turn may be connected to a core telecommunications network. Backhaul 109 may be standard industry technologies, such as free-space optical, microwave relay, Ethernet, WiMAX, SONET, DSL, or other similar technologies.

Figure 2:
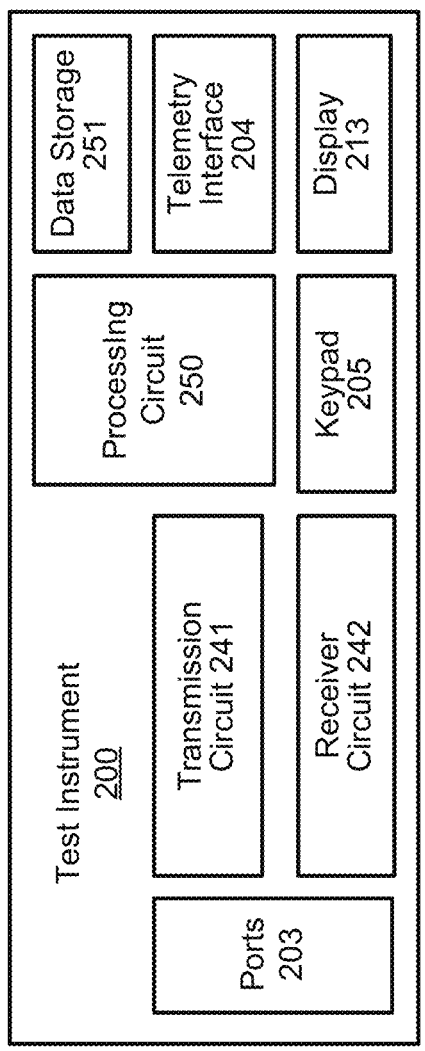
FIG. 2 illustrate a test instrument for measuring RF power using common public radio interface (CPRI) spectrum analysis, according to an example.

FIG. 2 illustrates a block diagram of a test instrument 200 for measuring RF power using common public radio interface (CPRI) spectrum analysis, according to an example. The test instrument 200 may include one or more ports 203 for connecting the test instrument 200 to a test point, such as the test point 309A shown in FIG. 3A. The ports 203 may include connectors for connecting to cables at a cell site carrying traffic for upstream and downstream channels. The test instrument 200 may include a telemetry interface 204 for connecting to a telemetry channel, such as a WiFi interface, Bluetooth interface, cellular interface or another network interface. The test instrument 200 may also connect to a remote device via the telemetry interface 204.

The test instrument 200 may include one or more ports 203 to connect to various test points at the cell site, such as the front haul of the BBU 105. In an example, the port(s) may include coaxial or optical RF cable connectors. It will be appreciated that test instrument 200 may also have other non-cable ports, for example, to connect to a computer or to an external display, such as, but not exclusively, one or more USB ports and the like.

The test instrument 200 may include a user interface which may include a keypad 205 and display 213. The display 213 may include a touch screen display. A user may interact with the test instrument 200 via the user interface to enter information, select operations, view measurements, examine signal profiles, communicate with other devices, etc.

A data storage 251 may store any information used by the test instrument 200 and may include memory or another type of known data storage device. The data storage 251 may store power measurements and/or any other measurements or data used by the test instrument 200. The data storage 251 may include a non-transitory computer readable medium storing machine-readable instructions executable by processing circuit 250 to perform operations of the test instrument 200.

A transmission circuit 241 may include a circuit for sending test signals into the cell site to perform various tests. The transmission circuit 241 may include encoders, modulators, and other known component for transmitting signals in the network. A receiver circuit 242 may include components for receiving signals from the network. The transmission circuit 241 and/or the receiver circuit 242 may also include other components, such as a demodulator, a decoder, an ADC, and/or other circuit components or elements.

Figure 3A:
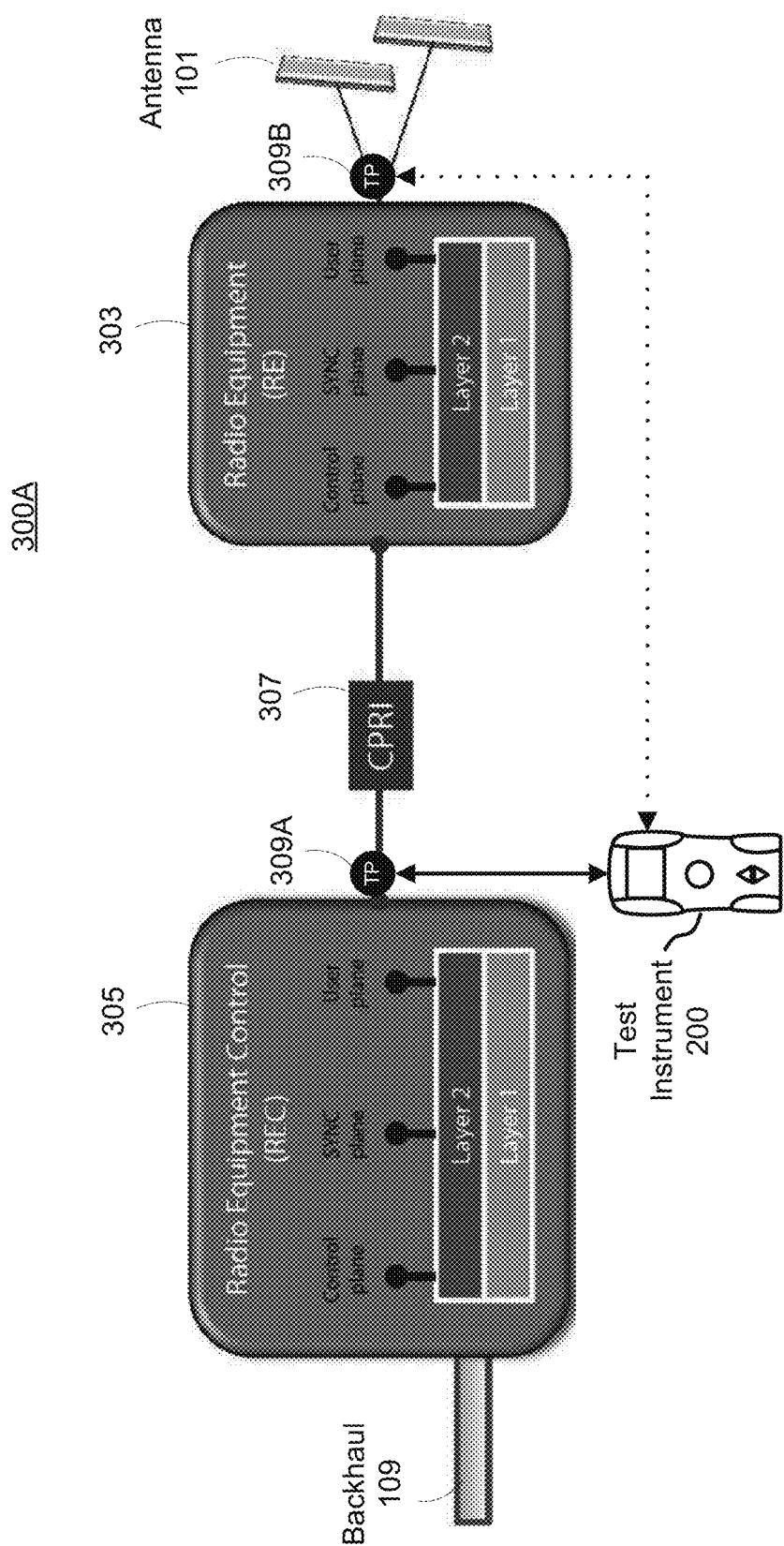
FIG. 3A illustrates common public radio interface (CPRI) multiplexing with test points, according to an example.
Figure 3B:
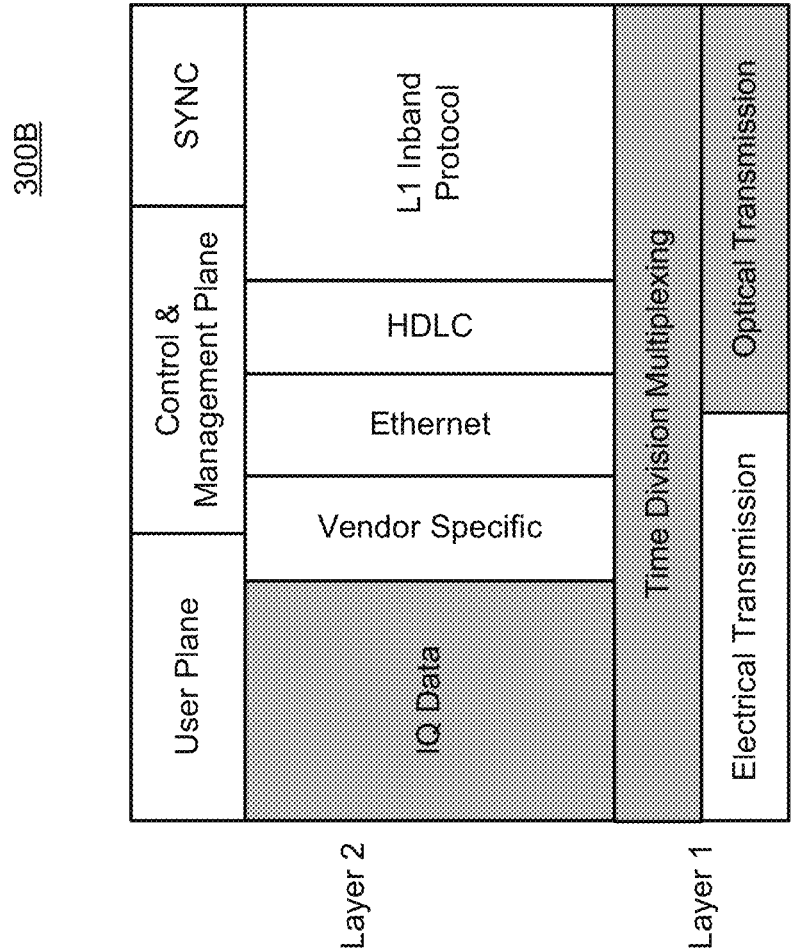
FIG. 3B illustrates a common public radio interface (CPRI) protocol, according to an example.
Figure 3C:
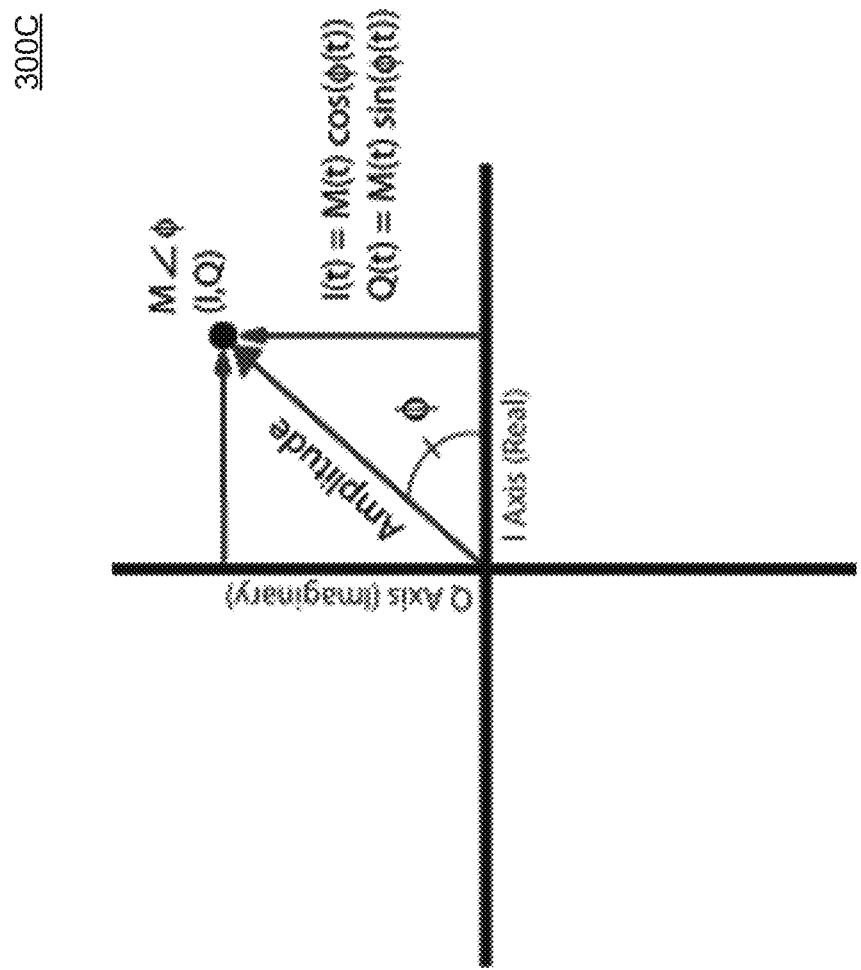
FIG. 3C illustrates IQ data represented in polar form for measuring RF power using common public radio interface (CPRI) spectrum analysis, according to an example.
Figure 3D:
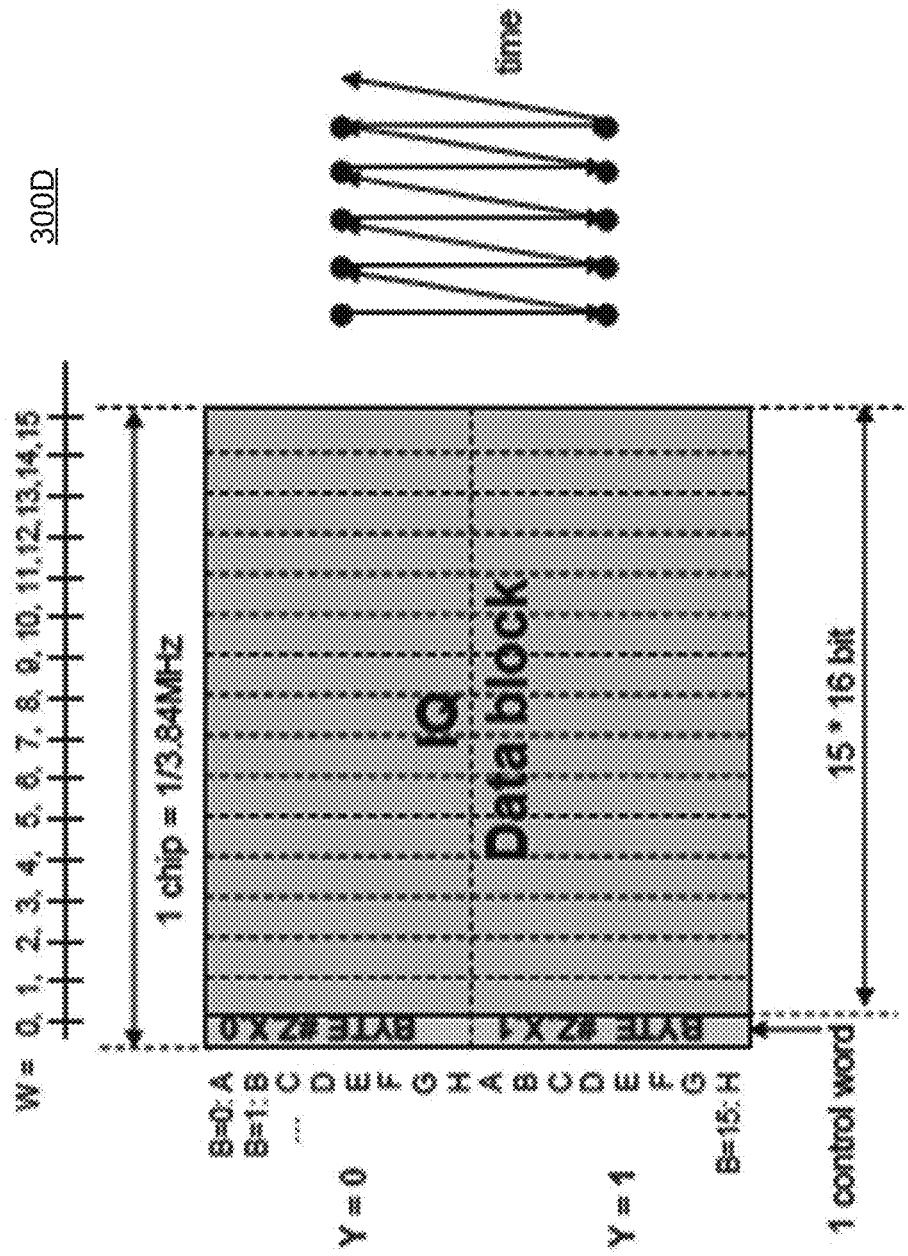
FIG. 3D illustrates a frame structure for an IQ data block measuring RF power using common public radio interface (CPRI) spectrum analysis, according to an example.
Figure 4:
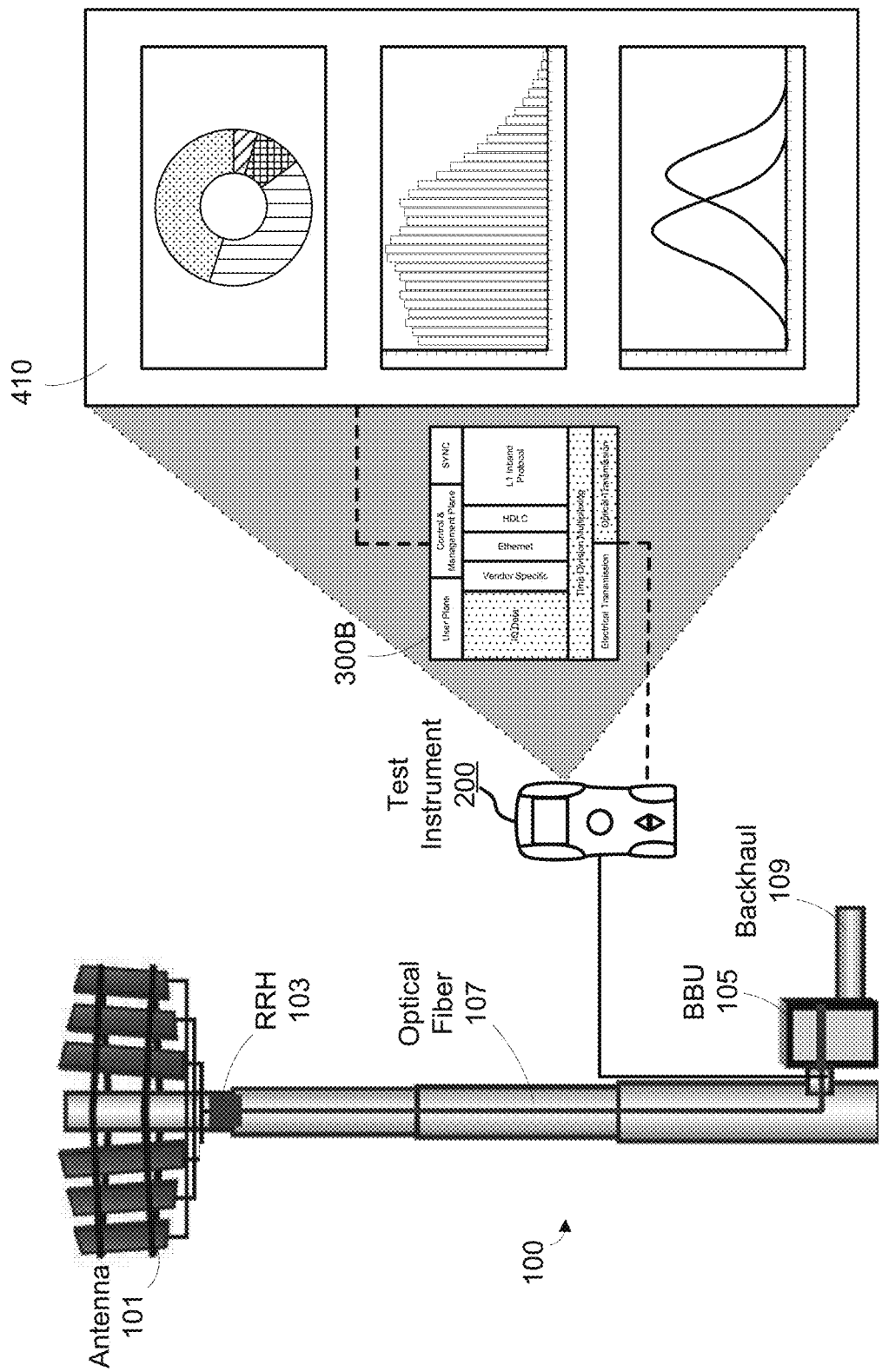
FIG. 4 illustrates a distributed cell site with a test instrument for measuring RF power using common public radio interface (CPRI) spectrum analysis, according to an example.
Figure 5:
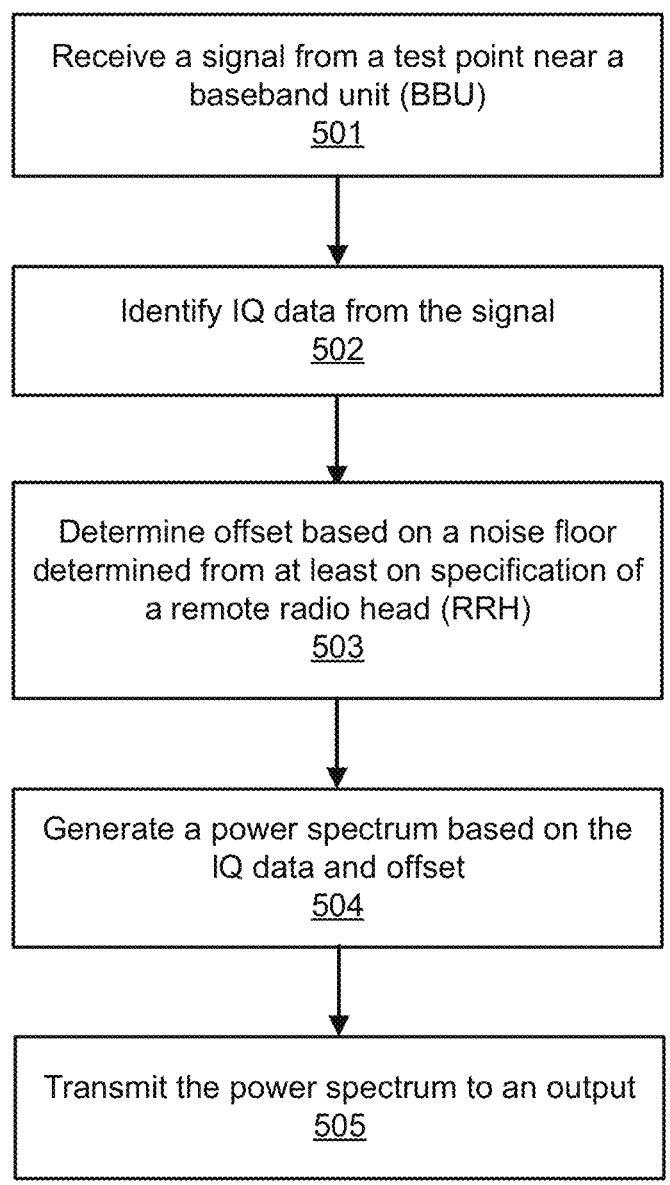
FIG. 5 illustrates a flow chart of a method for measuring RF power using common public radio interface (CPRI) spectrum analysis, according to an example.

A processing circuit 250 may include any suitable hardware to perform the operations of the test instrument 200 described herein, including the operations described with respect to FIGS. 3-5 and the techniques described herein, or otherwise. For example, the operations may include measuring and testing operations. The processing circuit 250 may include other components as well, such as a signal/interference analyzer, spectrum analyzer, profile/spectrum generator, and other measurement and reporting components. The hardware of the test instrument 200, including the processing circuit 250, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument 200 described herein may be performed by the processing circuit 250 or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile. It should be appreciated that the test instrument 200 may include components other than what is shown.

A cooperative industry effort defined as CPRI may be a specification for an interface between a radio equipment control (REC) (e.g., located at or near the BBH 105) and a radio equipment (RE) (e.g., located at or near the RRH 103). In some examples, CPRI may the specification for interfacing an REC and RE when optical fiber (or fiber-optic feeder) is deployed.

FIG. 3A illustrates common public radio interface (CPRI) multiplexing 300A, according to an example. As shown, radio equipment (RE) 303 may be connected to antennas 101 for over-air interface. The RE 303 may be connected to radio equipment control (REC) 305 via an optical fiber (e.g., CPRI 307). The REC 305 may be connected to backhaul 109 for network interface.

The CPRI interface may be characterized by a full-duplex, synchronized, and steady transfer of digital baseband data that guarantees high bandwidth and high throughput with low latency. Less time-critical data, such as control information (e.g., for link setup), as well as time-aligned data (e.g., for Rx and Tx gain control) may be transferred in addition to user information.

As depicted, three different information flows may be multiplexed over CPRI. These may include: (i) user-plane data, (ii) control- and management-plane data, and (iii) synchronization-plane data. The clock and timing control may ensure that the REC 305 and RE 303 are synchronized. Timing information may be included in baseband data. A frame structure with control words (CWs) may provide a basis for transfer of that information. The RE 303 may synchronize its clock and frame timing to a master reference (clock recovery) at the REC 305. This may be essential to map/demap or code/decode digital data correctly as well as to resend CPRI data to another RRH in a chain topology.

Referring back to FIG. 1, the test instrument 200 may test and measure signals at various test points at the cell site. In an example, as shown in FIG. 3, the test instrument 200 may measure and analyze signals from test point 309A, a point along the optical fiber 107 (or CPRI 307 in FIG. 3) at a front haul area near the REC 305. Taking advantage of RFoCPRI technology, the test instrument 200 may measure and analyze signals at an uplink (UL) of the optical fiber 107. In this way, even though the operator or technician may be at test point 309A near the BBU, he or she may be effectively measuring the signal between the antenna and RRH at test point 309B, without having to climb the tower of the cell site. It should be appreciated that while techniques described herein are directed to power measurements, RFoCPRI spectrum analysis may provide a host of measurements, including various RF metrics, such as DTF, VSWR, as well as optical power, integrity, performance, etc.

FIG. 3B illustrates a common public radio interface (CPRI) protocol 300B, according to an example. The CPRI protocol 300B may define Layer 1 (PHY) and Layer 2 (MAC) of the Open System Interconnection (OSI) model. Higher layers may not be specified by CPRI but defined and implemented by vendors of the REC and RE. In other words, there are many possibilities for using CPRI data containers for individual users, as well as control and management information. The user (baseband IQ), control and management, and synchronization data streams may be multiplexed over the same physical interface. In this example, Layer 1 may include electrical transmission and/or optical transmission, as well time division multiplexing (TDM). Layer 2 may include information flows that involve IQ data, vendor specific, Ethernet, HDLC, and/or L1 in-band protocol.

FIG. 3C illustrates IQ data represented in polar form for measuring RF power using common public radio interface (CPRI) spectrum analysis 300C, according to an example. It should be appreciated that RF communication systems use advanced forms of modulation to increase the amount of data that can be transmitted in a given amount of frequency spectrum. Signal modulation may be divided into two broad categories: analog modulation and digital modulation. IQ data may then be understood as a translation of amplitude and phase data from a polar coordinate system to a Cartesian (X, Y) coordinate system. As shown in FIG. 3C, using trigonometry, polar coordinate sine wave information may be converted into Cartesian I/Q sine wave data. These two representations may be equivalent and contain the same information, just in different forms.

Accordingly, IQ data may represent a message signal, and projections onto the I and Q axes may represent individual I and Q waveforms corresponding to a PM sine wave with fixed magnitude and oscillating phase. Because the IQ data waveforms are Cartesian translations of polar amplitude and phase waveforms, additional analysis may be needed to determine a nature or content of the message signal. Such analysis may help measure power, interference, signal performance, etc. of the message signal.

FIG. 3D illustrates a frame structure for an IQ data block measuring RF power using common public radio interface (CPRI) spectrum analysis 300D, according to an example. An IQ data block structure for a 1,228.8 Mb/s CPRI line bit rate may be shown in 300D. IQ data may be transferred in the form of a frame structure with basic, hyper, and radio frames. A basic frame may consist of 16 words. The first word (W0) of each frame may be a CW. The remaining words (W1-15) may be used for user IQ data (IQ data block).

As described above, an operator or technician may perform spectrum analysis on an uplink (UL) to find out if there are any issues present over the air. This would typically occur at a test point between antennas 101 and the RRH 103, as shown in FIG. 1. However, there are many challenges to do this and techniques described herein, using RFoCPRI technology, may help obviate these obstacles.

FIG. 4 illustrates a distributed cell site with a test instrument for measuring RF power using common public radio interface (CPRI) spectrum analysis, according to an example. As shown, the test instrument 200 may be connected at a test point near a front haul of the BBU 105. More specifically, the test instrument 200 may monitor CPRI uplink (from RRH). While examples described herein are directed to monitoring UL channels, it should be appreciated that test instrument 200 may also monitor downlink (from BBU) signals as well.

In general, the test instrument 200 may use RFoCPRI to perform a variety of RF maintenance, troubleshooting, and performance operations at a ground level via optical fiber 107 at a front haul of the BBU 105. For instance, the test instrument 200 may use RFoCPRI to verify CPRI control signals and may also extract RF (IQ) data transmitted between the BBU and RRU. This may enable monitoring and analysis of interference of mobile terminals (uplink), as well as the radio's signal analysis (uplink/downlink).

As described above, there are no systems that accurately report RF power by simply analyzing CPRI signal. At best, conventional spectral analyzers may measure power in resolution bandwidth (RBW). This, however, may need to be correlated as noise floor in LTE 180 KHz RB (resource block) to determine power of an RF signal in CPRI. The noise floor may be an RF noise floor. In this way, the test instrument 200 may employ spectral analysis using CPRI protocol 300B to determine RF power of the signal as if the test instrument were at a test point between the RRH 103 and antennas 101. The test instrument 200 may also use this spectral analysis to generate a variety of reports and analyses 410 for an operator or technician.

FIG. 5 illustrates a flow chart of a method 500 for measuring RF power using common public radio interface (CPRI) spectrum analysis, according to an example. The method 500 is provided by way of example, as there may be a variety of ways to carry out the method described herein. Although the method 500 is primarily described as being performed by test instrument 200 in at least scenarios depicted in FIGS. 1-4, the method 500 may be executed or otherwise performed by one or more processing components of the test instrument 200, or by another system or a combination of systems. Each block shown in FIG. 5 may further represent one or more processes, methods, or subroutines, and one or more of the blocks may include machine readable instructions stored on a non-transitory computer readable medium and executed by a processor or other type of processing circuit to perform one or more operations described herein.

At block 501, the test instrument 200 may receive, at the port 203, receiver circuit 242, and/or processing circuit 250, a signal from a test point at a cell site. The cell site may be a distributed cell site such that a remote radio head (RRH) 103 and a baseband unit (BBU) 105 are separated and connected via an optical fiber 107 (or feeder). In an example, the signal may be a radio frequency (RF) over common public radio interface (CPRI) (RFoCPRI) signal. For RF power measurement, the test point 309A be at a front haul of the baseband unit (BBU).

At block 503, the processing circuit 250 of the test instrument 200 may receive or identify IQ data from the signal. As described above, IQ data may include information associated with power of the signal. The power of the signal may be radio frequency (RF) power. Using this information, in addition to various operations or techniques, the test instrument 200 may then determine, at the processing circuit 250, a more accurate and reliable power measurement of the signal.

At block 503, the test instrument 200 may determine, at the processing circuit 250, an offset based on a noise floor and a specification of a remote radio head (RRH) 103 from which the signal is traversing. The specification of the RRH 103, for example, may be tied to a brand, a model number, a design, an arrangement of components in the RRH 103, or other particular detail. The arrangement of components that affect the offset determination may include an amplifier, a band pass filter, a voltage-controlled oscillator (VCO), a modulator, or other component. In other words, in order to provide an accurate power measurement, it will be important to know what type of RRH is employed at the top of the tower. For example, if an ALU® PRB (power resource block) or Ericsson® RB (resource block) is used—each with its own specific designs, components, and layouts, this detail may be used to determine the appropriate offset and noise floor.

Other than having these specifications stored in the test instrument 200, it should be appreciated that there may other techniques that could be used to help determine the offset. For example, an operator or user may be able to manual enter parameters into the test instrument 200 to help determine the offset. In another example, the test instrument may send a test signal and, using known parameters, determine the offset that way. In yet another example, the test instrument 200 may use the telemetry interface to search third party data sources for the specification information that is not already pre-stored or manually entered into the test instrument 200. These and other techniques may be provided to facilitate offset determinations.

At block 504, the test instrument 200 may generate, at the processing circuit 250, a power spectrum based on the IQ data and offset. It should be appreciated that the power spectrum be generated in a variety of ways. In an example, an initial (first) power spectrum may first be generated based on the IQ data. The offset may then be applied to normalize the initial power spectrum. A second (final) power spectrum may then be generated based on the normalization of the initial power spectrum. It should be appreciated that other techniques may be used. For example, an initial power spectrum may not be generated at all. The offset may be applied values and parameters of the power signal directly. In this case, the only spectrum generated would be the final power spectrum.

At block 505, the test instrument 200 may transmit, at the processing circuit 250, the power spectrum to an output. The output may be a display that provides at visual data, audio data, textual data associated with the power of the signal to be viewed by an operator or user of the test instrument. As disclosed herein, the power spectrum that is outputted may be representative of the power of the signal between the RRH 103 and antennas 101 of the cell site, even though the signal is received at a test point near the BBU 105.

It should also be appreciated that the test instrument 200 may also provide other components not shown. For example, middleware (not shown) may be included as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the test instrument 200, for example, may also be performed partially or in full by other various components of the overall system.

It should be appreciated that the data stores described herein may include volatile and/or nonvolatile data storage that may store data and software or firmware including machine-readable instructions. The software or firmware may include subroutines or applications that perform the functions of the test instrument 200 and/or run one or more application that utilize data from the test instrument 200 or other communicatively coupled system.

The various components, circuits, elements, and interfaces, may be any number of hardware, network, or software components, circuits, elements, and interfaces that serves to facilitate communication, exchange, and analysis data between any number of or combination of equipment, protocol layers, or applications. For example, the interfaces described herein may each include a network interface to communicate with other servers, devices, components or network elements via a network.

Although examples are directed to measuring radio frequency (RF) power in common public radio interface (CPRI) spectrum analysis of a cell site, it should be appreciated that that the test instrument 200 may also use these and other various techniques in to provide interference analysis, signal analysis, and/or other related RF measurements. Ultimately, the systems and methods described herein may minimize cell towner climbs and improve safety, reduce number of testing devices, increase accuracy and reliability, and significantly reduce maintenance and operation expenses.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A test device, comprising:
    a processor to determine power of a signal from a test point of a cell site by:
        receiving data from the signal, where in the data comprises information associated with power of the signal;
        determining an offset based on a noise floor and at least one specification of a remote radio head (RRH) from which the signal is traversing; and generating a power spectrum based on the data and offset, wherein the power spectrum is representative of the power of the signal between the RRH and antennas of the cell site.

2. The test device of claim 1, wherein the signal is a radio frequency (RF) over common public radio interface (CPRI) (RFoCPRI) signal.

3. The test device of claim 1, wherein the power of the signal is a radio frequency (RF) power.

4. The test device of claim 1, wherein the cell site is a distributed cell site such that the remote radio head (RRH) and a baseband unit (BBU) are separated and connected via an optical feeder.

5. The test device of claim 4, wherein the test point is at a front haul of the baseband unit (BBU) or near the BBU of the cell site.

6. The test device of claim 5, wherein the offset normalizes to the power spectrum such that the power spectrum, even though measured at a front haul of the baseband unit (BBU), represents power between the RRH and antennas.

7. The test device of claim 1, wherein the specification of the RRH comprises a brand, a model number, a design, or an arrangement of components, wherein the arrangement of components comprises at least one of an amplifier, a band pass filter, a voltage-controlled oscillator (VCO), or a modulator.

8. The test device of claim 1, wherein generating the power spectrum comprises:
receiving an initial power spectrum based on the data;
applying the offset to normalize the initial power spectrum; and
generating the power spectrum based on the normalization.

9. The test device of claim 1, wherein the processor further comprises:
transmitting the power spectrum to an output, wherein the output is a display that provides at least one of visual data or audio associated with the power of the signal to a user.

10. A method, comprising:
receiving a signal from a test point of a cell site;
identifying data from the signal, wherein the data comprises information associated with power of the signal;
determining an offset based on a noise floor and at least one specification of a remote radio head (RRH) from which the signal is traversing; and
generating a power spectrum based on the data and offset, wherein the power spectrum is representative of the power of the signal between the RRH and antennas of the cell site.

11. The method of claim 10, wherein the signal is a radio frequency (RF) over common public radio interface (CPRI) (RFoCPRI) signal.

12. The method of claim 10, wherein the power of the signal is a radio frequency (RF) power.

13. The method of claim 10, wherein the cell site is a distributed cell site such that the remote radio head (RRH) and a baseband unit (BBU) are separated and connected via an optical feeder.

14. The method of claim 13, wherein the test point is at a front haul of the baseband unit (BBU) or near the BBU of the cell site.

15. The method of claim 14, wherein the offset normalizes to the power spectrum such that the power spectrum, even though measured at a front haul of the baseband unit (BBU), represents power between the RRH and antennas.

16. The method of claim 10, wherein the specification of the RRH comprises a brand, a model number, a design, or an arrangement of components, wherein the arrangement of components comprises at least one of an amplifier, a band pass filter, a voltage-controlled oscillator (VCO), or a modulator.

17. The method of claim 10, wherein generating the power spectrum comprises:
generating an initial power spectrum based on the data;
applying the offset to normalize the initial power spectrum; and
generating the power spectrum based on the normalization.

18. The method of claim 10, further comprising:
transmitting the power spectrum to an output, wherein the output is a display that provides at least one of visual data or audio associated with the power of the signal to a user.

19. A non-transitory computer-readable storage medium having an executable stored thereon, which when executed instructs a processor to:
receive a signal from a test point of a cell site;
identify data from the signal, wherein the data comprises information associated with power of the signal;
determine an offset based on a noise floor and at least one specification of a remote radio head (RRH) from which the signal is traversing; and
generate a power spectrum based on the data and offset, wherein the power spectrum is representative of the power of the signal between the RRH and antennas of the cell site.

20. The non-transitory computer-readable storage medium of claim 19, further comprising:
transmitting the power spectrum to an output, wherein the output provides at least one of visual data or audio associated with the power of the signal to a user.

* * * * *